United States Patent [19]
Ichino et al.

[11] Patent Number: 5,542,698
[45] Date of Patent: Aug. 6, 1996

[54] CIRCULAR AIR BAG MOUNTED TO AN INSTRUMENT PANEL

[75] Inventors: Rie Ichino, Nagoya; Michiyasu Ito, Kasugai; Yuji Kuriyama, Seki; Kouji Shiraki, Motosu-gun, all of Japan

[73] Assignee: Toyoda Gosei Co., Ltd., Japan

[21] Appl. No.: 417,772

[22] Filed: Apr. 6, 1995

[30] Foreign Application Priority Data

Apr. 26, 1994 [JP] Japan ...................... 6-087044

[51] Int. Cl.⁶ .................................. B60R 21/22
[52] U.S. Cl. ........................ 280/732; 280/743.1
[58] Field of Search ................ 280/743.1, 732, 280/728.2, 730.1, 731, 728.1, 743.2, 729, 730.2

[56] References Cited

U.S. PATENT DOCUMENTS

| | | | |
|---|---|---|---|
| 3,476,402 | 11/1969 | Wilfert | 280/729 |
| 4,010,055 | 3/1977 | Oka et al. | |
| 4,474,390 | 10/1984 | Scholz et al. | 280/730.1 |
| 4,911,471 | 3/1990 | Hirabayashi | 280/732 |
| 5,087,067 | 2/1992 | Seki et al. | 280/732 |
| 5,090,729 | 2/1992 | Watanabe | 280/743.1 |
| 5,290,061 | 3/1994 | Bollaert | 280/743.1 |

FOREIGN PATENT DOCUMENTS

| | | |
|---|---|---|
| 0523704A1 | 1/1993 | European Pat. Off. . |
| 2944319A1 | 5/1981 | Germany . |
| 3210043A1 | 9/1983 | Germany . |
| 4040096A1 | 6/1991 | Germany . |
| 52-3229 | 1/1977 | Japan . |
| 3136942 | 6/1991 | Japan . |

OTHER PUBLICATIONS

Abstract—Japanese Patent No. JP4143141, Publication Date May 1992, vol. 16, No. 422—Inventor: Kunio et al., European Patent Office.
Search Report, European Patent office, Aug. 18, 1995.

*Primary Examiner*—Eric D. Culbreth
*Assistant Examiner*—Peter C. English
*Attorney, Agent, or Firm*—Cushman Darby & Cushman, L.L.P.

[57] ABSTRACT

An air bag system for a navigator's or passenger's seat includes a casing with an opening arranged in an instrument panel below an inclined windshield. An air bag, having a gas inlet port and accommodated in a folded shape in the casing, is held at the peripheral edge of the gas inlet port by the casing. When inflated, the air bag will extend a great distance toward the passenger's seat and will also interfere with the windshield. The inflator is arranged in the casing for feeding the gases to the gas inlet port of the air bag which is offset from the center of one of the base cloths, and the opening of the casing is covered but opens upon inflation. The air bag is shaped by sewing the peripheral edges of two circular base cloths.

6 Claims, 4 Drawing Sheets

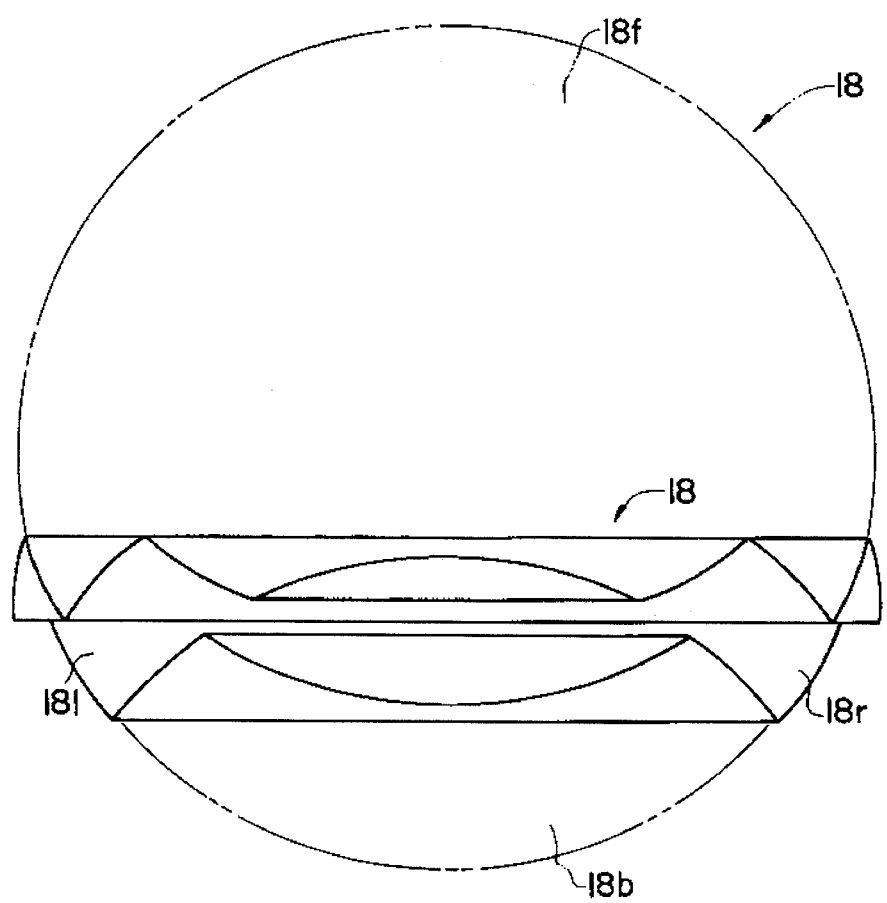
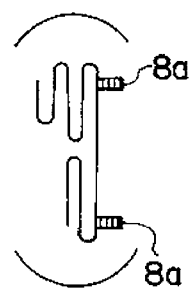
FIG. 4B
FIG. 4A
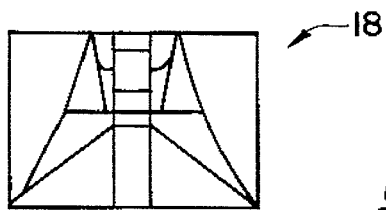
FIG. 4C
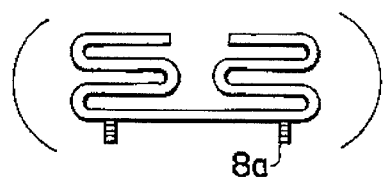
FIG. 4D

CIRCULAR AIR BAG MOUNTED TO AN INSTRUMENT PANEL

BACKGROUND OF THE INVENTION

1. Field of the Invention

The present invention relates to an air bag system which is arranged in the instrument panel of a vehicle.

2. Related Art

In the prior art, the air bag of an air bag system arranged in front of the navigator's or passenger's seat is required to be inflated to a certain depth or extent. This is because the distance between the passenger and the instrument panel is relatively large with the air bag arranged in the instrument panel. As a result, the air bag per se is formed into a bag shape having a deepened square prism (as disclosed in Japanese Utility Model Publication No. 3229/1977 or Japanese Patent Laid-Open 136942/1991).

This air bag is manufactured by three-dimensionally sewing four base cloths, one for each of the four side walls, one top wall and one bottom wall of the generally square prism. These four include a first base cloth for the top wall and two side walls; two base cloths for the remaining side walls; and a fourth base cloth for the bottom wall. This complicates the sewing operation of the air bag.

Where three base cloths are used, a first will be for the top wall, the bottom wall and two side walls, with two base cloths being used for the remaining two side walls. Here, it is necessary to sew the three base cloths three-dimensionally. This sewing operation is also troublesome.

In order to eliminate such sewing problems, it is conceivable, as in a driver's air bag arranged in the steering wheel, to sew together two circular base cloths along their peripheral edges. In this case, however, the depth size is insufficient because two planar base cloths are used. This causes an inflated air bag to interfere with the windshield arranged at an inclination above the instrument panel. Accordingly, it is difficult to obtain an air bag configuration that will be simple to construct yet exhibit sufficient depth, toward the passenger, to be fully functional, even if the driver's air bag of the prior art is used as it is.

SUMMARY OF THE INVENTION

The present invention solves the above-specified problems and provides an air bag system for a passenger's seat, which can exhibit a predetermined backward or outward movement when the air bag is inflated and facilitates the sewing operation of the air bag, thereby reducing the number of steps and the cost for manufacturing the air bag.

According to an aspect of the present invention, there is provided an air bag system for a passenger's seat that includes a casing having an opening arranged in an instrument panel below an inclined windshield at the front side of a vehicle. The air bag has a gas inlet port and is folded in a casing which holds the peripheral edge of the gas inlet port. An inflator is arranged in the casing for feeding gases to the gas inlet port of the air bag. A cover, which lies over the opening of the casing, opens when the air bag is inflated. The gas inlet port is offset rearwardly from the center of one of the base cloths, and the air bag is shaped by sewing the peripheral edges of two circular base cloths. The opening of the casing is desirably arranged in the top surface of the instrument panel.

In the passenger's air bag system, according to the present invention, the folded air bag is inflated when fed with the gases from its gas inlet port which opens the cover of the casing. After this, the air bag protrudes from the casing opening to interfere with the windshield so that it will move backward toward the passenger's seat.

In this instance, the air bag has its gas inlet port offset backward from the center of one of the base cloths and the air bag is retained at its peripheral edge on the casing. As a result, the air bag can have a larger area to interfere with the windshield than that of the case, in which the air bag has its gas inlet port arranged at the center of one base cloth (as in the driver's air bag of the prior art having its gas inlet port arranged at the center of the cloth), so that the air bag can retain the predetermined backward or rearward protrusion.

On the other hand, this air bag is manufactured by sewing the peripheral edges of two circular base cloths so that its sewing operation is as trouble free as with the driver's air bag.

Thus, the passenger's air bag system, according to the present invention, can not only retain the predetermined rearward movement upon inflation but also facilitate the sewing operation, thereby reducing the number of steps of sewing and the cost for manufacturing the air bag.

If, moreover, the casing has its opening arranged in the top surface of the instrument panel, the distance between the casing opening and the windshield can be shortened to reduce the interference distance of the windshield when the air bag is inflated. As a result, the air bag system is preferably enabled to cause the rearward movement of the inflated air bag quickly toward the passenger's seat.

Other objects, features, and characteristics of the present invention will become apparent upon consideration of the following description in the appended claims with reference to the accompanying drawings, all of which form a part of the specification, and wherein referenced numerals designate corresponding parts in the various figures.

BRIEF DESCRIPTION OF THE DRAWINGS

FIGS. 4A–4D show the procedure of folding the same air bag; and

DESCRIPTION OF THE PREFERRED EMBODIMENTS

The present invention will be described in the following in connection with its embodiments with reference to the accompanying drawings. The present invention should not be limited to its embodiments. All the modifications of the essentials of the claims and their equivalents should be included within the scope of the claims.

Figure 1:
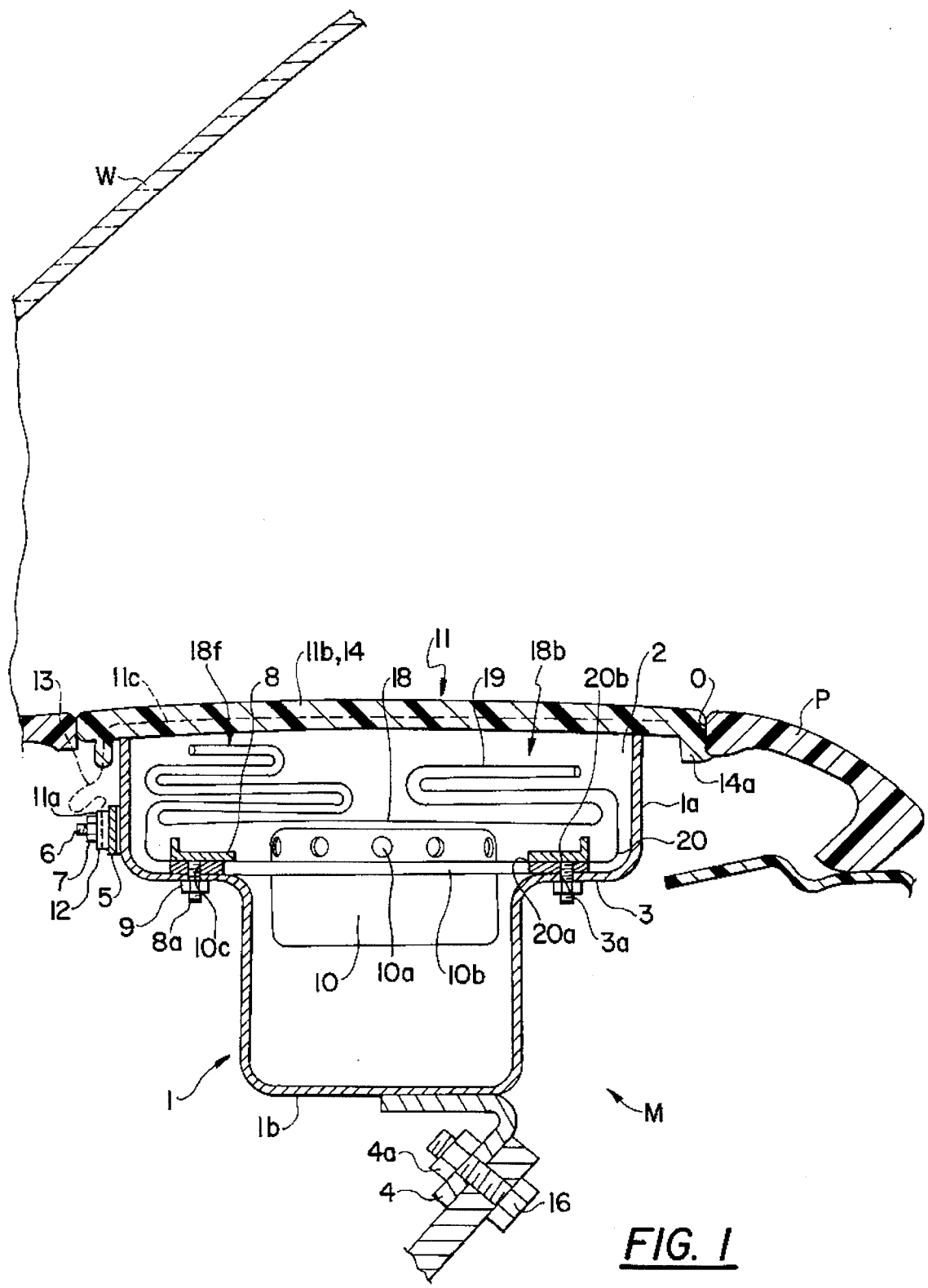
FIG. 1 is a cross-section showing one embodiment of the present invention.

A navigator's or passenger's air bag system M, according to an embodiment, is constructed as shown in FIG. 1. Included is a casing 1, an air bag 18, an inflator 10 and cover 11. The air bag 18 is stored in a folded state in casing 1. The inflator 10 is held in the casing 1 to feed gases for inflating the air bag 18. The casing 11 covers an opening 2 in the upper portion of casing 1.

Casing 1 is preferably made of sheet metal with its upper portion 1a formed into a square prism and its lower portion 1b formed into a bottomed cylinder. The upper portion 1a is arranged with the opening 2 having a rectangular shape. On the side of the upper portion 1a, moreover, there is fixed a bracket 5 having bolts 6 for mounting the cover 11. Moreover, a step 3, between the upper portion 1a and the lower portion 1b, is formed with through holes 3a for passing therethrough bolts 8a extending downwardly from an annular retainer 8, as will be further described hereinafter. On the lower face of the bottom wall of the casing lower portion 1b, a bracket 4 is fixed which is equipped with nuts 4a for fixing the air bag system M in the vehicle.

The air bag system M is constructed such that the opening 2 of casing 1 is arranged, when the system M is fixed in the vehicle, in an opening O in the upper face of the instrument panel p located below a windshield W that is inclined rearwardly on the vehicle.

The inflator 10 has its gas discharge ports 10a arranged in the casing upper portion 1a and its annular flange 10b abuts against the upper face of step 3 of casing 1. Inflator 10 is mounted in casing 1 by means of the bolts 8a of the later-described retainer 8. Numeral 10c designates through holes, formed in flange 10b, that allows bolts 8a to pass therethrough.

The cover 11 is formed of sheet portions 11a and 11b, and a reinforcing net 11c is buried in the sheet portions 11a and 11b. These sheet portions are made of a thermoplastic resin, such as a polymer blend of PA (polyamide) and PPO (polyphenylene oxide), a polymer blend of PC (polycarbonate) and an ABS resin, or PP (polypropylene). The net 11c is made of a net material of a synthetic resin such as aramid fibers or polyamide fibers.

The sheet portion 11a is formed into a slender and generally rectangular shape and serves as a mounting portion 12 to be fixed on the bracket 5. The sheet portion 11b serves as a cover body 14 for covering the opening 2 of the casing 1. The net 11c located between the sheet portions 11a and 11b provides a hinge portion 13 for opening the cover body 14 when the air bag 18 is inflated.

The mounting portion 12 is formed with a predetermined number of through holes (not shown) through which bolts 6 pass therethrough. Moreover, the edge of the cover body 14, apart from the hinge portion 13, is formed with a plurality of retaining pawls 14a for retaining the lower face of the peripheral edge of the opening O of the instrument panel P. These retaining pawls 14a prevent cover 11 from being opened while the air bag 18 is not inflated.

Figure 3:
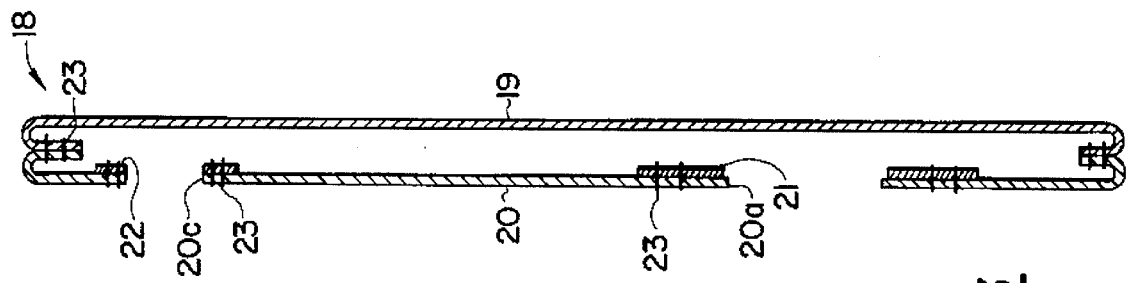
FIG. 3 is a cross-section showing the same air bag taken along lines III—III of FIG. 2.
Figure 2:
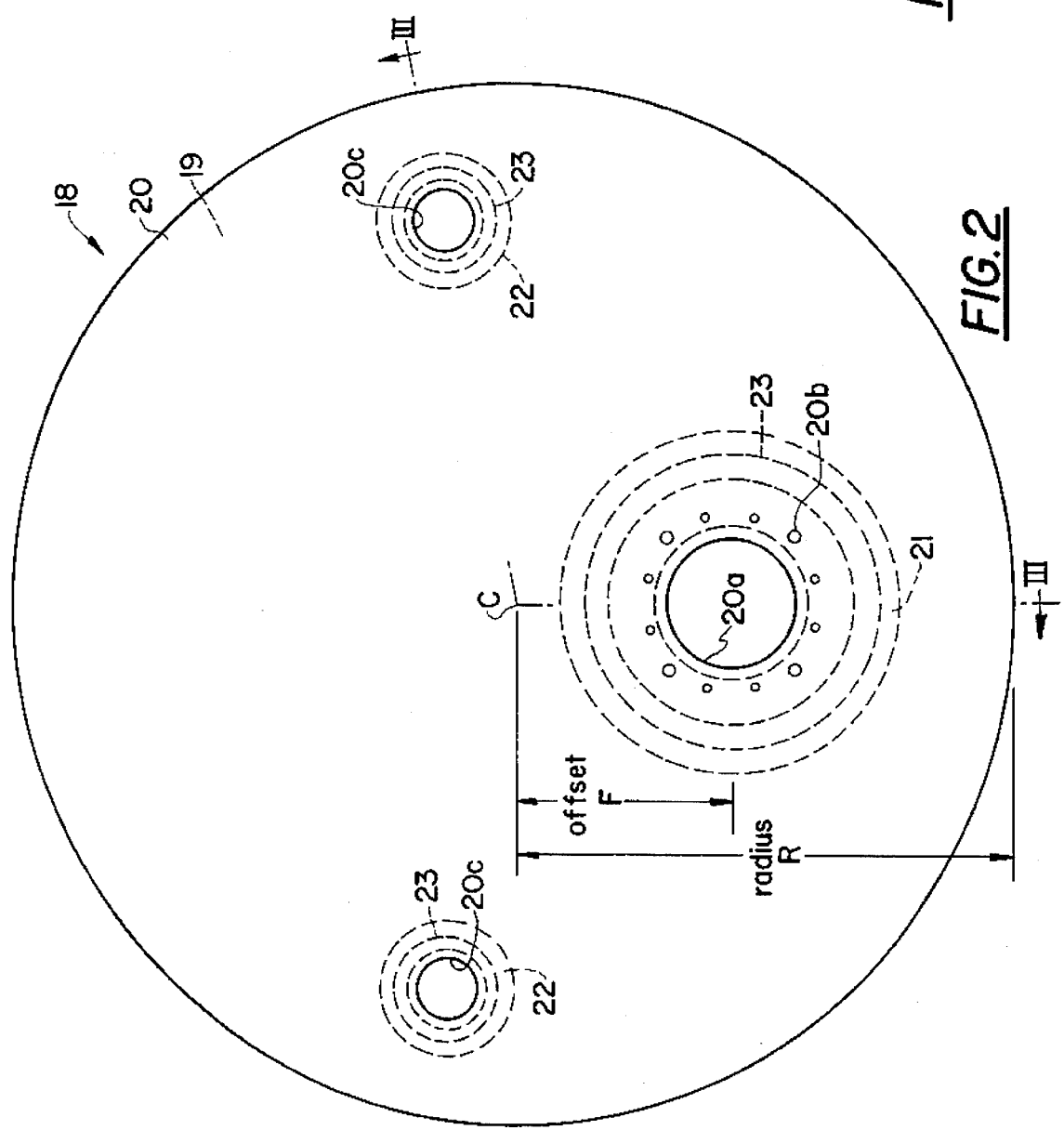
FIG. 2 is a bottom view showing the instant when the air bag of the same embodiment is expanded.

As shown in FIGS. 2 and 3, the air bag 18 is constructed of two sheets of circular base cloths 19 and 20, respectively. These base cloths 19 and 20 are, for example, woven of polyester, polyamide or aramid fibers. The base cloths 19 and 20 may be coated, if necessary, on their inner peripheries of the air bag 18 with heat-resisting rubber such as silicone rubber or chloroprene rubber.

Moreover, one base cloth 20 is formed with a gas inlet port 20a in a position offset or spaced from the center. The peripheral edge of the gas inlet port 20a is stitched with an annular reinforcing cloth 21 made of a material preferably identical to that of the base cloth 20. On the other hand, the gas inlet port 20a is formed in its peripheral edge with a plurality of mounting holes 20b for mounting it on the casing step 3. Numeral 20c designates vent holes which have their peripheral edges stitched with annular reinforcing cloths 22 also made of a material that is preferably identical to that of the base cloth 20.

For manufacturing the air bag 18 thus constructed, the base cloths 20 and 19, having the reinforcing cloths 21 and 22 stitched with stitching threads 23, are sewn first along their peripheral edges with threads 23 with their faces providing the outer surface of the air bag 18 being in face-to-face contact with each other. Then, the base cloths 20 and 19 are turned back through the gas inlet port 20a. The sewing operations of the outer peripheral edges of the base cloths 20 and 19 can be carried out remarkably easily by making use of industrial sewing machines because they follow along arcuate planes.

The retainer 8 is used to mount the air bag 18 and the inflator 10 on step 3 of casing 1. This retainer 8 is an annular sheet metal member formed with a predetermined number of bolts 8a extending downward. These bolts 8a are to be inserted into the mounting holes 20b of the air bag 18, the through holes 10c of the inflator flange 10b, and the through holes 3a of the casing step 3.

The assembling procedure of the air bag system M begins by folding air bag 18. For this folding operation, the retainer 8 is arranged around the gas inlet port 20a in the inner periphery of the air bag 18 and has its bolts 8a inserted into the corresponding mounting holes 20b of air bag 18. As shown in FIG. 4A–4D, air bag 18 is folded at first on its front side 18f and rear side 18b around the gas inlet port 20a with the folds being arranged as in FIG. 4B. Then, the air bag 18 is folded on its lefthand side 18l and righthand side 18r into the plan view configuration of FIG. 4C with the folds as in FIG. 4D.

After this, the inflator 10 has its flange 10b placed on the casing step 3. Thereafter, the folded air bag 18 is placed so the front side 18f of the gas inlet port 20a is arranged at the front side of the vehicle and its back side 18b arranged at the back side of the vehicle. Also, the retainer 8 has its individual bolts 8a inserted into the through holes 10c and 3a of the inflator flange 10b and the casing step 3, all of which are connected together by nuts 9. Then, the air bag 18 and the inflator 10 can be mounted on the casing 1.

Then, the bolts 6, fixed on the bracket 5, are inserted into the individual through holes (not shown) of the mounting portion 12 of cover 11. Thus, the assembly of the air bag system M is completed by screwing nuts 7 on bolts 6 and by mounting the cover 11 onto casing 1.

After this, the air bag system M can be arranged in a predetermined position in the instrument panel P by screwing bolts 16 on the nuts 4a of the bracket 4.

Figure 5:
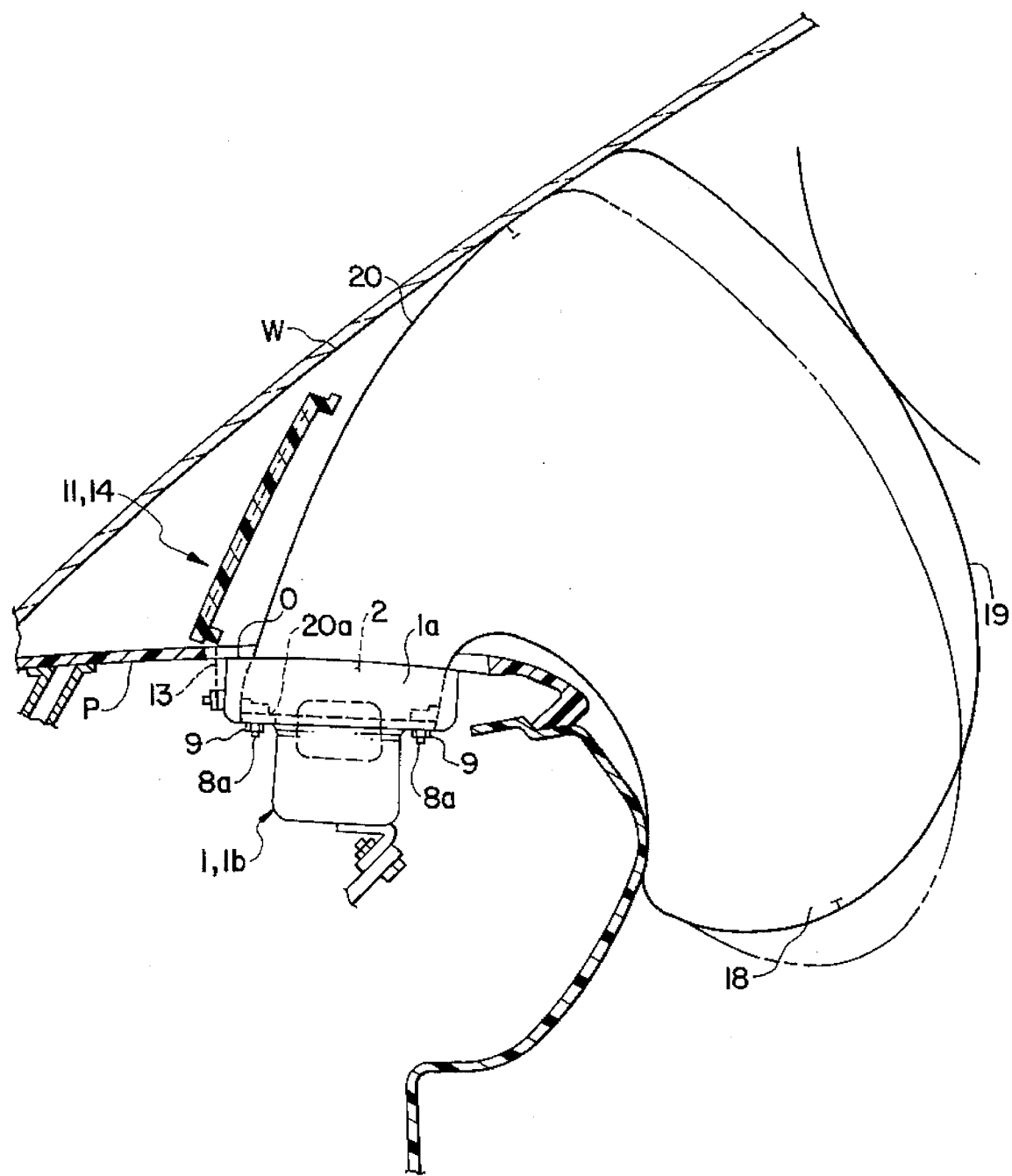
FIG. 5 is a schematic cross-section showing the instant when the air bag of the same embodiment is inflated.

After the air bag system M of the invention was mounted on the vehicle, the air bag 18 can be inflated if the gases are introduced from the gas discharge portions 10a of the inflator 10 into the air bag 18 through the gas inlet port 20a. Moreover, the air bag 18 forces the cover 11 (or cover body 14) to open the opening 2 of casing 1. Then, the air bag 18 protrudes from the casing opening 2, as shown in FIG. 5, in an extended manner rearwardly in front of the passenger's seat while also interfering or contacting the windshield W.

At this instant, the gas inlet port 20a of the air bag 1 is arranged, while being offset toward the rear of the vehicle from the center of one base cloth 20, to have its peripheral edge retained on the casing step 3. As a result, the portion of the air bag 18 interfering or touching windshield W is larger than that of the case, in which the gas inlet port 20a is arranged at the center of the base cloth 20, so that the rearward movement of the air bag 18 can be easily retained to a predetermined extent. If the gas inlet port 20a has its peripheral edge retained on the step 3 arranged at the center of the base cloth 20, the interfering portion contacting the windshield W would be so small that the air bag 18 would have its rearward movement reduced, when inflated, as indicated by a double-dotted curve in FIG. 5.

Moreover, the air bag 18 of the embodiment is manufactured by stitching the peripheral edges of the two circular base cloths 19 and 20 so that its sewing operations are simplified as in the air bag for a driver's seat.

According to the passenger's air bag system M of the invention, therefore, air bag 18 can retain its predetermined rearward movement when inflated, and its sewing operation can be simplified to reduce the number of steps of and the cost for manufacturing the air bag system M.

According to the air bag system M of the invention, moreover, case 1 has its opening 2 arranged in the top surface of the instrument panel P so that the distance between the casing opening 2 and the windshield W can be shortened. As a result, the interfering distance of the air bag 18, if inflated, with the windshield W can be shortened to quicken the rearward movement of the air bag 18 toward the passenger's seat.

The offset F of the gas inlet port 20a in the base cloth 20 of the air bag 18 from the center C of the base cloth 20 is suitably set according to the rearward movement of the air bag 18 when inflated. Specifically, the offset F from the center C of the base cloth 20 is desirably set within a range of 20 to 60% of the radius R of the base cloth 20.

The lower limit of this range is determined because a sufficient protrusion cannot be attained if the offset F is less than 20%. If the upper limit of 60% is exceeded, on the other hand, the distance between the peripheral edge of the gas inlet port 20a and the outer peripheral edge of the base cloth 20 is so shortened that the shortened portion becomes liable to receive the concentration of stress, when the air bag 18 is inflated, and, accordingly, could be broken.

As one example of the invention, the radius R of the base cloth 20 at the inflated time is set to 345 mm, and the offset F is set to 150 mm.

The invention is exemplified by the construction in which the casing 1 has its opening 2 arranged in the top surface of the instrument panel P. Despite this, however, the casing opening 2 may be arranged on the passenger's side of the instrument panel P if a predetermined rearward movement of the air bag 18, when inflated, is retained by the interference with windshield W.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air bag system for a vehicle comprising:
   (a) a casing having an opening arranged in an instrument panel below an inclined windshield;
   (b) an air bag having a gas inlet port and accommodated in a folded shape within said casing while being held along a peripheral edge of said gas inlet port by said casing, so that said air bag may protrude, upon inflation by gases coming from said inlet port, from the opening of said casing and contact said windshield, said air bag being formed from two circular base cloths each having peripheral edges which are sewn together, said gas inlet port being offset backward with respect to said vehicle from the center of one of said base cloths;
   (c) an inflator arranged in said casing for feeding inflation gases to said gas inlet port of said air bag; and
   (d) a cover covering the opening of said casing and adapted to be opened by inflation of said air bag.

2. An air bag system according to claim 1 wherein the opening of said casing is arranged in the top surface of said instrument panel.

3. An air bag system as in claim 1 wherein said gas inlet port is offset within a range of 20% to 60% of a radius of said one of said base cloths.

4. An air bag system as in claim 1 wherein said gas inlet port includes a reinforced peripheral edge.

5. An air bag system as in claim 1 wherein said cover includes an embedded reinforcing material.

6. An air bag system as in claim 5 wherein said reinforcing material comprises a net material.

* * * * *